United States Patent
Wu

(10) Patent No.: US 10,148,302 B1
(45) Date of Patent: Dec. 4, 2018

(54) SIM CARD CARRIER FOR FACILITATING SIM CARD EJECTION

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Wen-Bing Wu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/722,027

(22) Filed: Oct. 2, 2017

(30) Foreign Application Priority Data

Sep. 1, 2017 (CN) .......................... 2017 1 0781127

(51) Int. Cl.
| | |
|---|---|
| *H04B 1/3818* | (2015.01) |
| *H04B 1/3816* | (2015.01) |
| *H04M 1/02* | (2006.01) |
| *H04M 1/675* | (2006.01) |
| *G06K 13/08* | (2006.01) |
| *G06K 7/00* | (2006.01) |
| *H01R 13/629* | (2006.01) |

(52) U.S. Cl.
CPC ........... *H04B 1/3818* (2015.01); *G06K 7/003* (2013.01); *G06K 13/0825* (2013.01); *G06K 13/0831* (2013.01); *H01R 13/629* (2013.01)

(58) Field of Classification Search
CPC ...... H04B 1/3818; H04B 1/03; H04B 1/3816; H04B 1/08; H04M 1/0249; H04M 1/675; H04M 3/387; G06K 7/003; G06K 13/0825; H01R 13/629
See application file for complete search history.

(56) References Cited

U.S. PATENT DOCUMENTS

| | | | | |
|---|---|---|---|---|
| 2009/0267677 A1* | 10/2009 | Myers | ..................... | G06K 13/08 327/356 |
| 2012/0162925 A1* | 6/2012 | Luo | ..................... | G06K 13/0825 361/727 |
| 2014/0247567 A1* | 9/2014 | Wang | ..................... | H04M 1/026 361/754 |
| 2014/0273564 A1* | 9/2014 | Matsumoto | ........ | G06K 13/0812 439/153 |
| 2015/0207270 A1* | 7/2015 | Zhang | ................ | G06K 13/0831 439/159 |
| 2015/0311630 A1* | 10/2015 | Lei | ..................... | G06K 13/0831 439/310 |

* cited by examiner

*Primary Examiner* — Andrew Wendell
(74) *Attorney, Agent, or Firm* — ScienBiziP, P.C.

(57) ABSTRACT

A SIM card carrier includes a connector, an ejecting mechanism, and a tray. The connector includes a cavity having an open end, a closed end, a top side, and a bottom side. The ejecting mechanism includes a first resilient member and a movable arm. The first resilient member is disposed on the closed end of the cavity, the movable arm is disposed on the bottom side of the cavity. The tray includes a holder having a notch at a side and the movable arm engages the notch. The tray is held in the cavity when the notch is engaged, and the tray is ejected from the connector by the first resilient member when the movable arm disengages from the notch.

4 Claims, 4 Drawing Sheets

SIM CARD CARRIER FOR FACILITATING SIM CARD EJECTION

CROSS REFERENCE TO RELATED APPLICATION

This application claims priority to Chinese Patent Application No. 201710781127.5, filed on Sep. 1, 2017, the disclosure of which is incorporated herein by reference in its entirety.

FIELD

The present disclosure relates to subscriber identification module (SIM) card carriers for mobile devices such as mobile phones and tablets, and more particularly to a SIM card carrier facilitating ejection of a tray without using an ejector tool.

BACKGROUND

A conventional SIM card carrier only allows a SIM card tray to eject by using an ejector tool, such as a paper clip or pin. However, using the ejector tool is inconvenient and inefficient.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
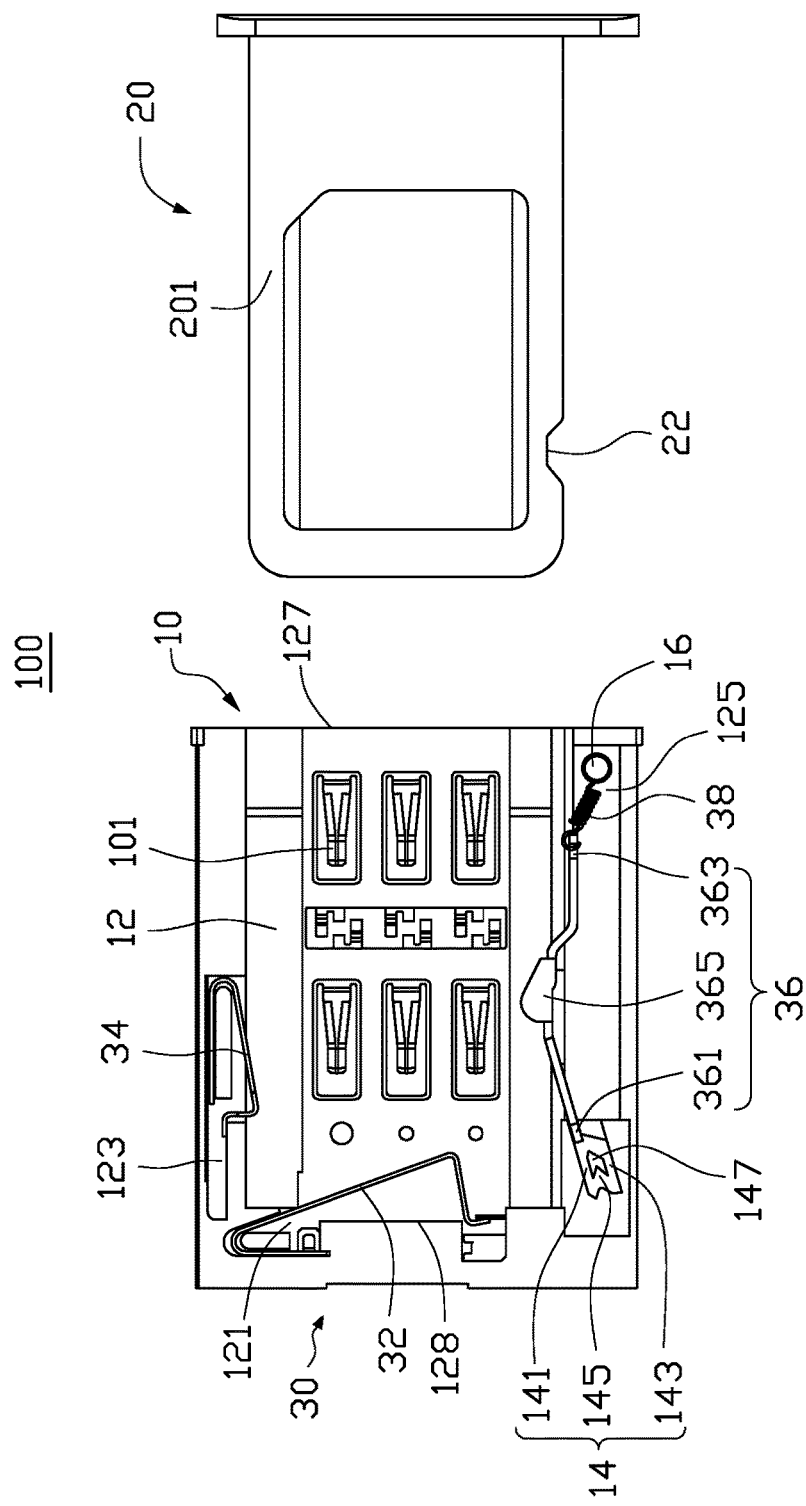
FIG. 1 is an exploded front view of a SIM card carrier.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

With reference to FIG. 1, an exemplary embodiment of a SIM card carrier 100 includes a connector 10, an ejecting mechanism 30, and a tray 20.

The connector 10 includes a cavity 12 and a plurality of electrical contacts 101. The cavity 12 has an open end 127, a closed end 128, a top side (not numbered), and a bottom side (not numbered). The electrical contacts 101 are disposed in the cavity 12.

The ejecting mechanism 30 includes a first resilient member 32, a second resilient member 34, and a movable arm 36. The first resilient member 32 is disposed on the closed end 128 of the cavity 12 of the connector 10. The second resilient member 34 is disposed on the top side of the cavity 12 of the connector 10. The movable arm 36 is disposed on the bottom side of the cavity 12 of the connector 10.

The tray 20 includes a holder 201 for holding a SIM card. The holder 201 has a notch 22 at a bottom side thereof. The tray 20 can be inserted into the cavity 12 of the connector 10 through the open end 127 of the cavity 12. The tray 20 is secured in the cavity 12 of the connector 10 when the movable arm 36 engages the notch 22 of the holder 201 such that the SIM card held in the holder 201 electrically connects to the electrical contacts 101 of the connector 10. The tray 20 is ejected from the connector 10 by the first resilient member 32 when the movable arm 36 disengages from the notch 22 of the holder 201.

In the present exemplary embodiment, the connector 10 further includes a first recess 121, a second recess 123, a third recess 125, a guide recess 14, a guide protrusion 147, a securing post 16, and a biasing member 38. The first recess 121 is located on the closed end 128 of the cavity 12, communicates with the cavity 12, and receives the first resilient member 32. The second recess 123 is located on the top side of the cavity 12, is adjacent to the closed end 128 of the cavity 12, communicates with the cavity 12, and receives the second resilient member 34. The third recess 125 is located on the bottom side of the cavity 12, communicates with the cavity 12, and receives the movable arm 36. The guide recess 14 is located on the bottom side of the cavity 12, is adjacent to the closed end 128 of the cavity 12, and communicates with the third recess 125. The guide recess 14 is M-shaped and has an inner side track 141, an outer side track 143, and a central track 145. The inner side track 141 is adjacent to the cavity 12, and the outer side track 143 is away from the cavity 12. The guide protrusion 147 is disposed between the inner side track 141, the outer side track 143, and the central track 145. The securing post 16 is disposed in the third recess 125 and is adjacent to the open end 127 of the cavity 12. The biasing member 38 may be a tension spring.

In the present exemplary embodiment, the movable arm 36 has a free end 361, a connecting end 363, and an engaging portion 365. The free end 361 and the connecting end 363 are located on opposite ends of the movable arm 36. The free end 361 is movably received in the guide recess 14. The connecting end 363 is connected to the securing post 16 by the biasing member 38. The engaging portion 365 is located on a middle of the movable arm 36 between the free end 361 and the connecting end 363, and is opposite to the second resilient member 34. The biasing member 38 provides tension to the movable arm 36, such that the engaging portion 365 of the movable arm 36 can protrude into the cavity 12 of the connector 10 for engaging the tray 20 received in the cavity 12 of the connector 10, and the free end 361 of the movable arm 36 can move to the inner side track 141 of the guide recess 14.

Figure 2:
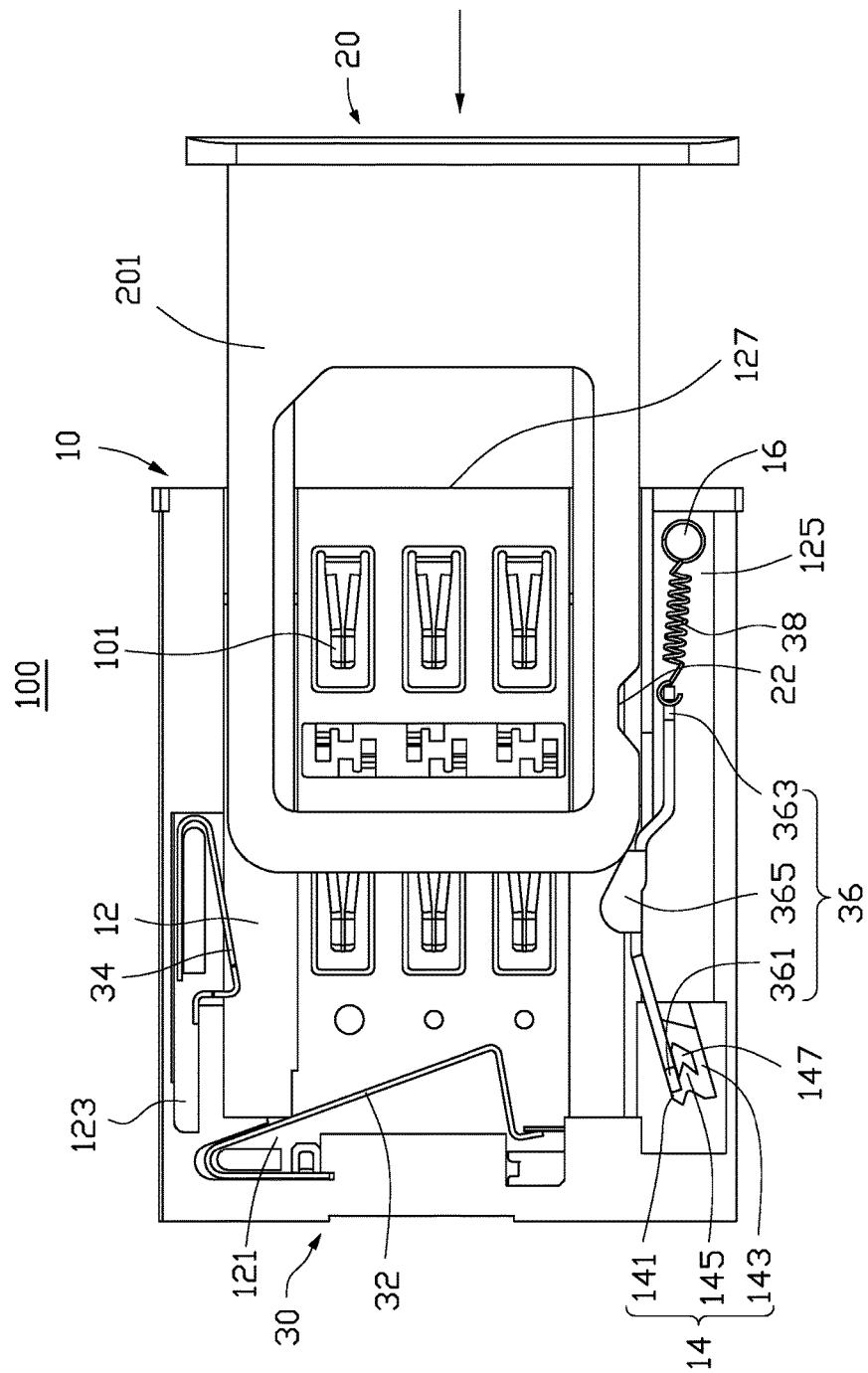
FIG. 2 is an enlarged front view of the SIM card carrier of FIG. 1 showing a tray being inserted in a connector.
Figure 3:
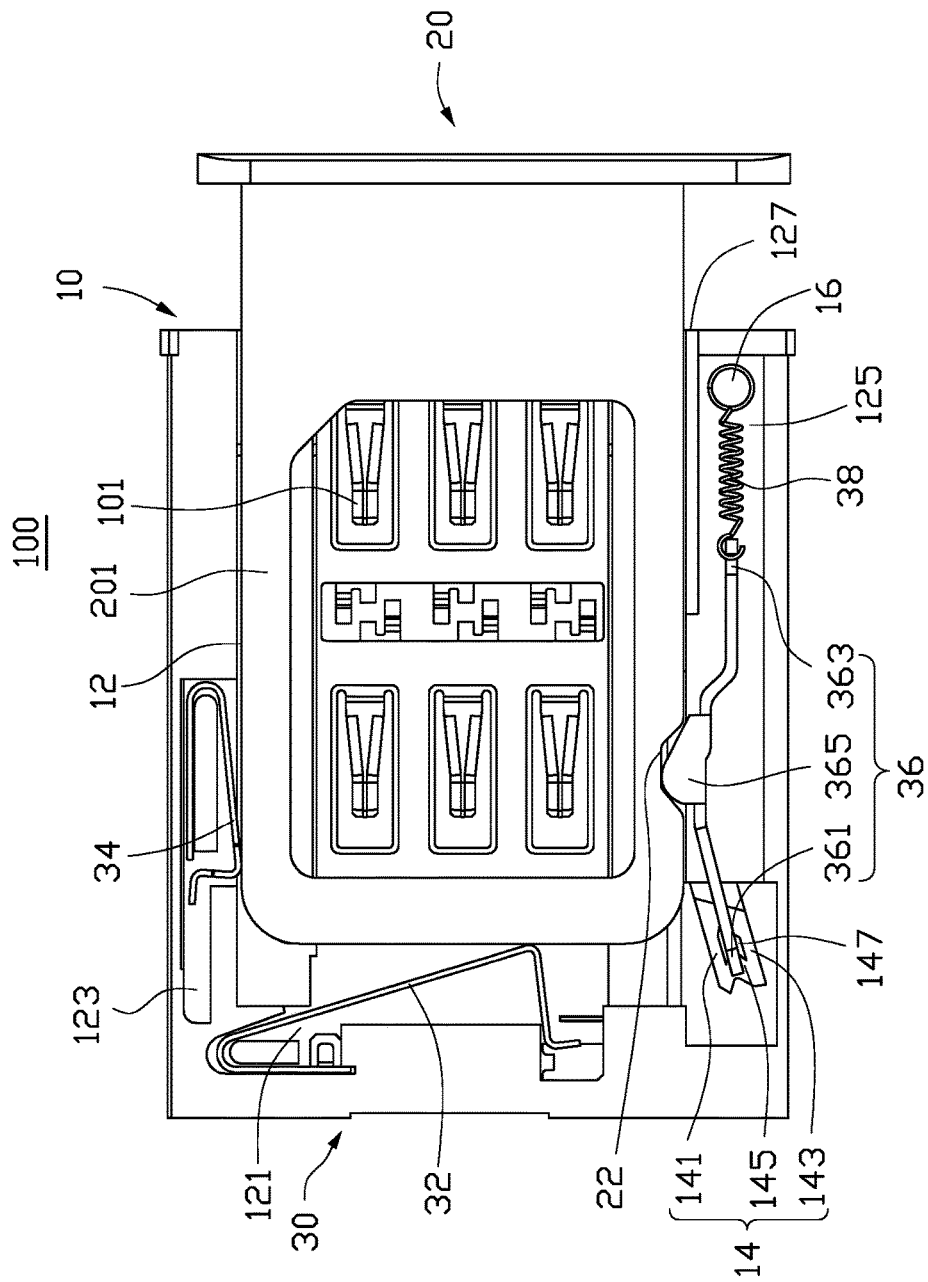
FIG. 3 is an enlarged front view of the SIM card carrier of FIG. 1 showing the tray held in the connector.

With reference to FIG. 2, when the tray 20 is inserted into the cavity 12 of the connector 10, the tray 20 pushes the engaging portion 365 of the movable arm 36 to move the movable arm 36 such that the free end 361 of the movable arm 36 is moved along the inner side track 141 to the central track 145. The guide protrusion 147 is then engaged. Under this circumstance, the biasing member 38 is stretched to store energy. With reference to FIG. 3, when the tray 20 continues to be inserted into the cavity 12 of the connector 10, the second resilient member 34 is pressed and the notch 22 of the holder 201 is brought to correspond to the engaging portion 365 of the movable arm 36. The engaging portion 365 of the movable arm 36 protrudes and engages the notch 22 of the holder 201 by the energy stored in the biasing member 38. The tray 20 is held in the connector 10 because the second resilient member 34 abuts the holder 201 and the engaging portion 365 of the movable arm 36 engages the notch 22 of the holder 201.

Figure 4:
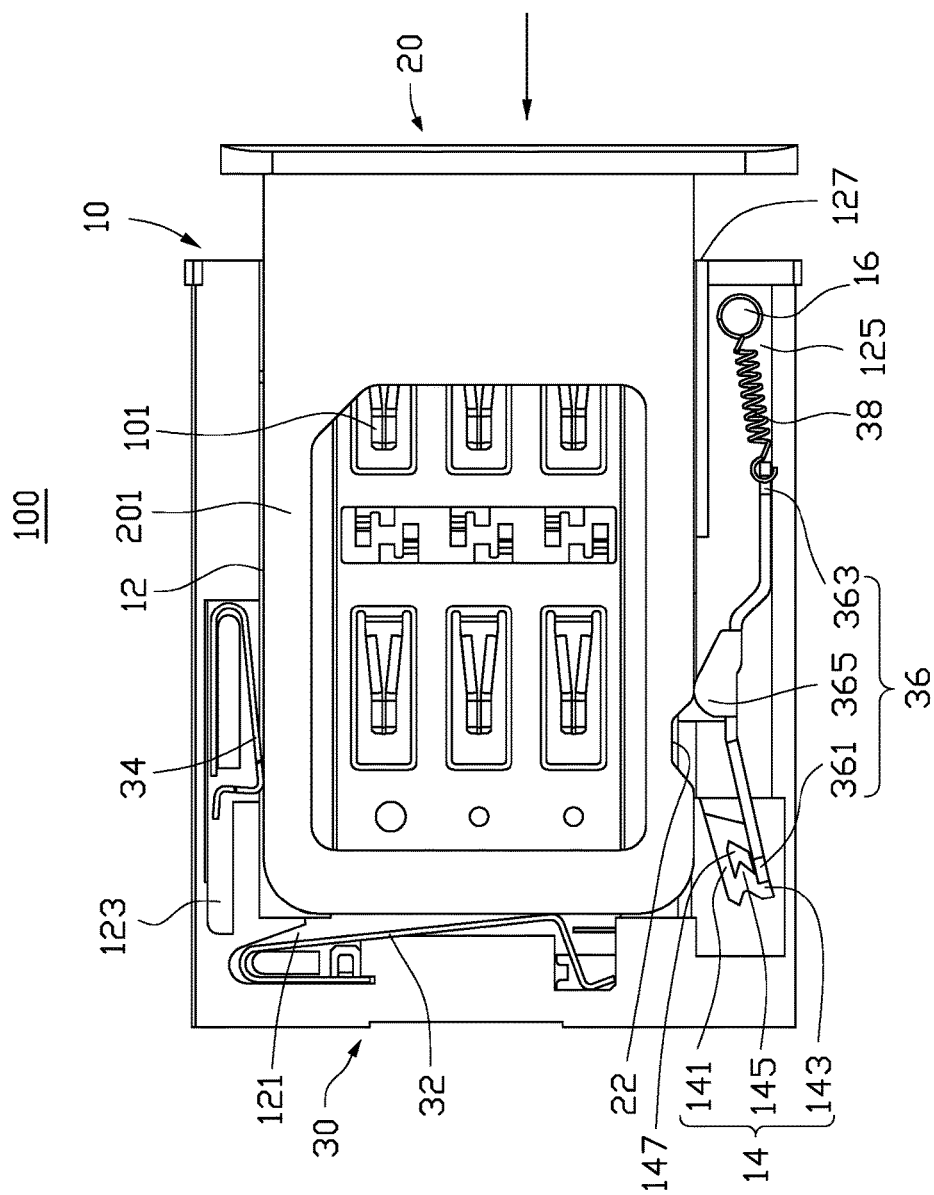
FIG. 4 is an enlarged front view of the SIM card carrier of FIG. 1 showing the tray disengaging from the connector.

With reference to FIG. 4, when disengagement of the tray 20 is desired, the tray 20 is pressed to push the engaging portion 365 of the movable arm 36 and to press the first resilient member 32 such that the engaging portion 365 of the movable arm 36 disengages from the notch 22 of the holder 201. The first resilient member 32 stores energy. The tray 20 pushes the engaging portion 365 of the movable arm 36 to move the movable arm 36 such that the free end 361 of the movable arm 36 is moved along the central track 145 to the outer side track 143. Under this circumstance, the biasing member 38 is stretched to store energy. Then tray 20 is ejected from the connector 10 by the energy stored in the first resilient member 32 when pressing of the tray 20 is stopped. The tray 20 can thus be easily removed from the connector 10. When the tray 20 is ejected from the connector 10, the energy stored in the biasing member 38 causes the free end 361 of the movable arm 36 to move along the outer side track 143 and back to the inner side track 141 and causes the engaging portion 365 of the movable arm 36 to protrude back into the cavity 12 of the connector 10.

The SIM card carrier 100 allows the tray 20 to be ejected by pressing thereon, which is convenient and efficient in operation.

The exemplary embodiments shown and described above are only examples. Many details are often found in the art such as the other features of a SIM card carrier. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A subscriber identification module (SIM) card carrier comprising:
a connector comprising:
a cavity having an open end, a closed end opposite to the open end, a top side, and a bottom side opposite to the top side;
a first recess located on the closed end of the cavity and receiving the first resilient member;
a second recess located on the top side of the cavity and receiving the second resilient member;
a third recess located on the bottom side of the cavity and receiving the movable arm;
a guide recess located on the bottom side of the cavity, and adjacent to the closed end of the cavity;
a securing post disposed in the third recess and adjacent to the open end of the cavity; and
a biasing member;
an ejecting mechanism comprising:
a first resilient member disposed on the closed end of the cavity of the connector;
a second resilient member disposed on the top side of the cavity of the connector; and
a movable arm disposed on the bottom side of the cavity of the connector; and
a tray comprising a holder having a notch at a side thereof;
wherein the movable arm selectively engages the notch of the holder of the tray;
wherein the tray is held in the cavity of the connector when the movable arm engages the notch of the holder, and the tray is ejected from the connector by the first resilient member when the movable arm disengages from the notch of the holder;
wherein the movable arm has a free end, a connecting end, and an engaging portion, the free end and the connecting end are located on opposite ends of the movable arm, the engaging portion is located on a middle of the movable arm between the free end and the connecting end and is opposite to the second resilient member, and the engaging portion selectively engages the notch of the holder of the tray received in the cavity of the connector;
wherein the free end of the movable arm is movably received in the guide recess, and the connecting end of the movable arm is connected to the securing post by the biasing member;
wherein the guide recess is M-shaped and has an inner side track, an outer side track, and a central track; and
wherein the engaging portion of the movable arm protrudes into the cavity of the connector when the free end of the movable arm is received in the inner side track of the guide recess, and the engaging portion of the movable arm retracts into the third recess when the free end of the movable arm is received in the outer side track of the guide recess.

2. The SIM card carrier of claim 1, wherein the engaging portion of the movable arm protrudes into the cavity of the connector and engages the notch of the holder of the tray when the free end of the movable arm is received in the central recess of the guide recess.

3. The SIM card carrier of claim 1,
wherein the connector further comprises a guide protrusion disposed between the inner side track, the outer side track, and the central track; and
wherein the engaging portion of the movable arm protrudes into the cavity of the connector and engages the notch of the holder of the tray when the free end of the movable arm engages the guide protrusion.

4. The SIM card carrier of claim 2,
wherein the connector further comprises a guide protrusion disposed between the inner side track, the outer side track, and the central track; and
wherein the engaging portion of the movable arm protrudes into the cavity of the connector and engages the notch of the holder of the tray when the free end of the movable arm engages the guide protrusion.

* * * * *